United States Patent Office 3,591,590
Patented July 6, 1971

3,591,590
DIISOCYANATES
Theobald Haug, Frenkendorf, and Hans Batzer, Arlesheim, Switzerland, assignors to Ciba Limited, Basel, Switzerland
No Drawing. Filed Mar. 9, 1970, Ser. No. 17,856
Claims priority, application Switzerland, Mar. 27, 1969, 4,793/69
Int. Cl. C07d 49/32, 51/30
U.S. Cl. 260—260    9 Claims

ABSTRACT OF THE DISCLOSURE

New 1,3-di-(γ-isocyanatopropyl)-hydantoins and -dihyuracils, for example 1,3-di-(γ-isocyanatopropyl)-5,5-dimethylhydantoin or 1,3-di-(γ-isocyanatopropyl)-5,5-dimethyl-5,6-dihydrouracil and their use for the manufacture of polyurethanes by reaction with polyhydroxyl compounds. The new diisocyanates are completely odourless; irritation of the mucus membranes was not detectable; they are therefore preferably used in the lacquer field. The new diisocyanates react significantly more rapidly with primary alcohols than do aliphatic diisocyanates, for example 1,6-hexamethylenediisocyanate, and on the other hand more slowly than aromatic diisocyanates, for example 1,4-toluylenediisocyanate.

---

It is known to react organic molecules which contain one or more isocyanate groups with organic compounds which possess one or more OH groups. Urethanes are thereby obtained. In principle it is possible to add all hydrogen atoms replaceable by alkali metal in organic molecules to isocyanate groups.

Organic diisocyanates or polyisocyanates are extensively used for the manufacture of polyurethanes. For this purpose, organic diisocyanates or polyisocyanates are reacted with diols or polyalcohols, for example polyesterglycols or polyether-glycols. Depending on the isocyanates and alcohols employed, polyurethanes are thereby produced in accordance with suitable processes, which can be used as fibres, films, foams, adhesives or moulding materials. A comprehensive description of polyurethane manufacture is given in Vieweg-Höchtlen, Kunststoffhandbuch (Handbook of Plastics), volume 7, page 207 et seq.

Furthermore, organic diisocyanates or polyisocyanates can be used for the manufacture of polyureas, for which organic diisocyanates or polyisocyanates are reacted with organic diamines or polyamines. Since the isocyanate group can add to urea groupings already formed, branched or crosslinked polyureas containing biuret groups are easily produced.

The diisocyanates used in industry, such as for example hexamethylenediisocyanate, phenyl-1,4-diisocyanate, toluylene-2,4-diisocyanate and toluylene-2,6-diisocyanate, possess unpleasant physiological properties and as a result their processing demands involved protective measures, or these disadvantageous properties must be eliminated by converting the diisocyanates into higher molecular isocyanates of low volatility. For example, 2,4-toluylene-diisocyanate is dimerised to 1,3-bis-(4′-methyl-3′-isocyanatophenyl)-uretidione (a product of Messrs. Bayer commercially available under the registered trade name "Desmodur TT"), or 3 molecules of 2,4-toluylene-diisocyanate are added to 1 molecule of 1,1,1-trimethylolpropane, whereby an aromatic isocyanate containing urethane groups, which in the ideal case is trifunctional, is produced (a product of Messrs. Bayer commercially available under the registered trade name "Desmodur L," having an isocyanate content of about 19.2%), or 3 mols of 1,6-hexamethylenediisocyanate (registered trade name "Desmodur H") are allowed to react with 1 mol of water, whereby, in the ideal case, an aliphatic isocyanate containing biuret groups which is again trifunctional is produced (a product of Messrs. Bayer commercially available under the registered trade name "Desmodur N," having an isocyanate content of 26.3%).

It is furthermore known that isocyanate groups which are bonded to a primary aliphatic carbon atom react distinctly more slowly with replaceable hydrogen atoms than do aromatically bonded isocyanate groups.

It has now been found that diisocyanates which are derived from mononuclear N-heterocyclic compounds, such as hydantoin and dihydrouracil, for example 1,3-di-(γ-isocyanatopropyl)-5,5-dimethylhydantoin, react significantly more rapidly, for example with primary alcohols than does, for example, 1,6-hexamethylenediisocyanate or 3,3,5 - trimethyl-3-(isocyanatomethyl)-cyclohexaneisocyanate-(1), and on the other hand more slowly than aromatic diisocyanates, for example 2,4-toluylenediisocyanate. As a result of this gradation of reactivity and as a result of the observation that in contrast to the physiologically non-harmless diisocyanates, such as 1,6-hexamethylenediisocyanate and 2,4-toluylenediisocyanate, the diisocyanates of the mononuclear N-heterocyclic compounds are entirely odourless and an irritation of the mucus membranes has hitherto not been observed, the use of these diisocyanates for the manufacture of urethanes and polyureas for certain applications is of particular interest.

The subject of the present invention is thus new mononuclear N-heterocyclic diisocyanates of formula

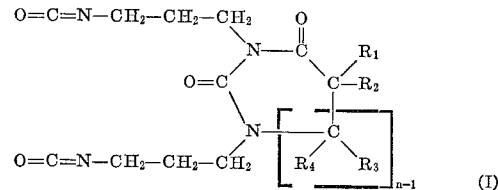

wherein $R_1$ and $R_3$ independently of one another each denote a hydrogen atom or an aliphatic, cycloaliphatic, araliphatic or aromatic hydrocarbon radical, such as especially a lower alkyl radical with 1 to 4 carbon atoms, $R_2$ and $R_4$ each represent an alkyl radical, especially a lower alkyl radical with 1 to 4 carbon atoms or a hydrogen atom, or wherein $R_1$ and $R_2$ together form a divalent aliphatic or cycloaliphatic hydrocarbon radical, preferably a tetramethylene or pentamethylene radical, and $n$ denotes an integer having a value of 1 or 2.

Preferably, the radicals $R_1$, $R_2$ and $R_3$ in the above mentioned Formula I either denote a hydrogen atom or a $C_1$-$C_4$-alkyl and the radical $R_4$ denotes a hydrogen atom.

As diisocyanates of Formula I there may for example be mentioned:

1,3-di-(γ-isocyanatopropyl)-hydrantoin,
1,3-di-(γ-isocyanatopropyl)-5-methyl-hydantoin,
1,3-di-(γ-isocyanatopropyl)-5,5-dimethyl-hydantoin,
1,3-di-(γ-isocyanatopropyl)-5-methyl-5-ethyl-hydantoin,
1,3-di-(γ-isocyanatopropyl)-5-ethyl-hydantoin,
1,3-di(γ-isocyanatopropyl)-5,5-diethylhydantoin,
1,3-di(γ-isocyanatopropyl)-5-propylhydantoin,
1,3-di-(γ-isocyanatopropyl)-5-isopropylhydantoin,
1,3-di-(γ-isocyanatopropyl)-1,3-diazaspiro-[4.4]-nonane-2,4-dione and
1,3-di-(γ-isocyanatopropyl)-1,3-diazaspiro-[4.5]-decane-2,4-dione,
1,3-di-(γ-isocyanatopropyl)-5,5-dimethyl-5,6-dihydrouracil and
1,3-di-(γ-isocyanatopropyl)-6-methyl-5,6-dihydrouracil.

The new diisocyanates of Formula I can be manufactured according to the invention by reacting diamines of formula

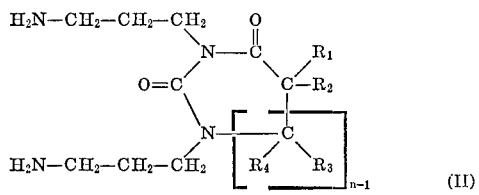

wherein $R_1$, $R_2$, $R_3$, $R_4$ and $n$ have the same significance as in Formula I, with phosgene. Here it is preferable to start from the hydrochlorides of the diamines of Formula II, which are then reacted with phosgene in o-dichlorobenzene or other organic inert solvents at 50–170°. Another process consists of converting the diamines of Formula II by means of carbon dioxide first into the appropriate carbamic acids or their betaine-like salts and then to phosgenate these. A further method is the dropwise addition of the solution of the diamines of Formula II to a cooled solution of phosgene in an inert solvent. The new diisocyanates of Formula I are furthermore produced in accordance with a continuous process in which phosgene and the diamine solution are simultaneously added to a hot inert solvent and wherein the diisocyanate solution is withdrawn from the reaction vessel, provided with an overflow, at the same rate as the diamine solution is added.

The diamines of Formula II are obtained by hydrogenating, in a manner which is in itself known, the di-($\beta$-cyanoethyl) compounds obtained by cyanoethylation of the corresponding hydantoins, uracils and dihydrouracils.

As mentioned initially it is possible to add all hydrogen atoms replaceable by alkali in organic molecules to isocyanate groups. As an example, the following compounds or classes of compounds may be mentioned: alcohols, amines, carboxylic acids, phenols, ureas, urethanes, hydrazines, water, ammonia, hydrogen sulphate, imines, thioureas, sulphimides, amides, thiols, aminoalcohols, sulphonamides, hydrazones, semicarbazones, oximes, hydroxycarboxylic acids, aminocarboxylic acids as well as all polymers which contain active hydrogen atoms in the form of hydroxyl, carboxyl or amino groups and the like. The isocyanates of Formula I can be employed for the poly-addition or crosslinking either by themselves or mixed with other isocyanates, diisocyanates, or polyisocyanates. Depending on the nature and amount of the crosslinkings, both very firm brittle masses and plastics with rubbery-elastic properties can be manufactured.

In order to manufacture thermoplasts, the diisocyanates of Formula I can be reacted with glycols, such as ethylene glycol, 1,3-propylene glycol, 1,4-butanediol or with any desired dialcohols which can also carry isocyclic, aromatic, heterocyclic or also linear hetero groupings, such as also ester groupings.

Possible crosslinking agents or curing agents are above all those classes of compounds which yield three-dimensionally crosslinked, infusible and insoluble products with the diisocyanates of Formula I.

Polyhydroxyl compounds above all serve as crosslinking agents or as curing agents of this nature. There may for example be mentioned polyesters, containing hydroxyl groups, from adipic acid, phthalic acid or dimerised unsaturated fatty acids with diols and/or triols, such as ethylene glycol, 1,4-butanediol, 1,5-pentanediol, glycerine, diethylene glycol; castor oil; linear or partially branched polypropylene-ether glycols, polytetramethylene-ether glycols; polythioether glycols, polyacetal glycols; sugars and sugar derivatives; higher-functional polyols, such as trimethylolpropane.

Further possible crosslinking agents are above all the polyamines, especially aromatic polyamines, such as 4,4'-diaminodiphenylmethane, as well as such compounds as simultaneously contain hydroxyl and amino groups, such as for example tri-isopropanolamine.

The polyaddition reaction of glycols, polyhydroxy compounds and polyamino compounds with the diisocyanates of Formula I can be carried out directly without diluents, and temperatures in the range of about 50 to 300° C. can be necessary depending on the nature of the reagents. It is also possible to work in diluents, for example halogenobenzenes.

The molecular weight of the polyurethane can be varied in a manner which is in itself known depending on the variation of the molecular ratio of the components, removal of the heat of reaction from the melt, increase of the dwell time in the dissolved state, and addition of monofunctional, that is to say chain-stopping, components. In general it is necessary, for use in the plastics field, to polymerise up to an average molecular weight of about 6000. Low molecular types are primarily of interest for the lacquer field.

The polyaddition reaction can also be carried out in the presence of accelerators; this is however not compellingly necessary. Possible catalysts are especially tertiary amines, such as pyridine, N,N'-dimethylpiperazine, N,N-dimethylbenzylamine, tributylamine, triethylamine, N-methylmorpholine, N-methylpyrrole, N-methylpyrrolidine, diaza-(2.2.2)-bicyclooctane or diethyl-2-hydroxyethylamine, and also metal salts such as $FeCl_3$, $AlCl_3$, $ZnCl_2$, $SnCl_2$, $tin^{II}$ isooctoate, lead octoate, lead naphthenate and the dilaurate of tin-dibutyl. A survey of the most extensively used catalysts is furthermore to be found in "Houben-Weyl," 4th edition, volume XIV/2 on page 61 (Review by E. Müller).

For the manufacture of foams, blowing agents and surface-active substances, such as for example silicone compounds, as foam stabilisers can be conjointly used in in a manner which is in itself known.

The manufacture of polyurethane plastics products is in general carried out with simultaneous shaping to give castings, foam articles, pressings, lacquer films, laminates, adhesive bonds and the like. Herein, the procedure followed is that a mixture of the diisocyanate of Formula I and the polyhydroxyl compound as well as the optionally conjointly used catalyst and/or blowing agent, foam stabiliser and the like is manufactured and this mixture is then, after filling into casting or pressing moulds, spreading as coatings, introduction into adhesive joints and the like, allowed to complete reaction, with heat being supplied, so as to give the plastic.

A further subject of the present invention are therefore moulding compositions which can under the influence of heat be converted into mouldings or foam articles including two-dimensional structures such as coatings or adhesive joints, which contain (a) a mononuclear N-heterocyclic diisocyanate of Formula I and (b) a polyhydroxyl compound as well as, optionally, a curiing catalyst and/or blowing agents and foam stabilisers.

Of course further customary additives for polyisocyanate moulding compositions, such as fillers, reinforcing agents, mould release agents, antioxidants, agents for protection against ageing, light protection agents, UV absorbers, flameproofing substances, optical brighteners, dyestuffs or pigments, can be added to the moulding compositions.

Suitable fillers or reinforcing agents are fibrous or pulverulent inorganic as well as organic substances. The following may be mentioned: quartz powder, aluminium oxide trihydrate, mica, aluminium powder, iron powder, iron oxide, ground dolomite, chalk powder, gypsum, slate powder, unburnt kaolin (bolus), glass fibres, boron fibres, carbon fibres, asbestos fibres and especially fillers of high water absorbency such as for example anhydrous silicon dioxide, silica aerogel, anhydrous aluminium oxide, active charcoal, zeolites, bentonites and burnt kaolin.

The moulding compositions can furthermore, in the unfilled or filled state, serve as dipping resins, casting resins, laminating resins, impregnating resins, lacquers, coating agents, sealing compositions, potting and insulating compositions for the electrical industry, or adhesives.

In addition to manual processing, mechanised methods of processing can advantageously be used for the manufacture of polyurethane plastics, such methods permitting continuous mixing of the diisocyanates (a) with the components (b) containing hydroxyl groups, with the formation of a homogeneous melt. Thus the most diverse shaped articles (hard rubber substitute) can be manufactured by casting or centrifugal moulding. Further applications exist in the field of casting compositions for filling joints by casting, or for sealing of pipe couplings, and also as floor coverings or road surfaces, as impression compositions or as adhesives. It is simple to manufacture self-supporting films, strips or filaments and to carry out impregnations or coatings of textiles, fibre materials (leather substitute) or paper. The new moulding compositions can, if the reaction speed is appropriately adjusted, for example serve for lining containers or for the manufacture of endless tubes of any profile by means of continuously operating heated extruders. Rigid foams or hard foams manufactured from foaming compositions according to the invention are for example employed as insulating materials for buildings and refrigeration units, as packaging materials and above all for shock absorption, for example as vibration-damping constructional components in car construction and machinery construction.

In the examples which follow, unless otherwise stated, parts denote parts by weight and percentages denote perrentages by weight. The relationship of parts by volume to parts by weight is as of the millilitre to the gram.

MANUFACTURING EXAMPLES.—EXAMPLE 1

Carbon dioxide was passed for 2 hours into a solution of 50.0 g. (0.202 mol) of 1,3di-($\gamma$-aminopropyl)-5,5-dimethylhydantoin in 500 ml. of dry o-dichlorobenzene. In the course thereof the temperature rose from 21° C. to 38° C. and a jelly-like suspension was produced. The temperature was now raised to 90–95° C. and carbon dioxide was introduced for a further 3 hours, in the course of which the jelly-like mass was in part converted into a colourless suspension. After cooling, phosgene was introduced for 2 hours at 21–28° C., and thereafter the temperature was slowly raised to 150° C. and further phosgene introduced for a total of 10 hours. The solution was decanted from the slight residue and concentrated to constant weight at 90° C./10 mm. Hg. 54.0 g. of a yellow viscous oil with an isocyanate content of 25.9% (91% of theory) remained. A distillation of this crude product yielded 37.2 g. of colourless 1,3-di-($\gamma$-isocyanatopropyl)-5,5-dimethylhydantoin of boiling point $_{0.2}$ 175–180° C. and having an isocyanate content of 27.25% (96% of theory).

Elementary analysis.—Calculated: $C_{13}H_{18}N_4O_4$ (294.3), (percent): C, 53.05; H, 6.16; N, 19.04. Found (percent): C, 53.13; H, 6.25; N, 18.84.

The H-NMR (nuclear magnetic resonance) spectrum and IR (infrared) spectrum agree with the assumed structure. Accordingly the resulting diisocyanate has the formula:

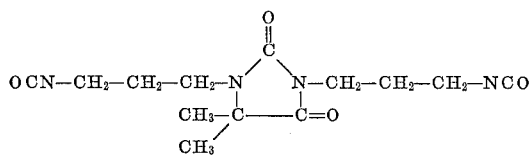

EXAMPLE 2

A glass vessel which could be heated and was provided with an overflow was charged with dry o-dichlorobenzene and the latter heated to about 165° C. A solution of 20 g. of 1,3-di-($\gamma$-aminopropyl)-5,5-diethylhydantoin in 380 ml. of dry o-dichlorobenzene was added dropwise at this temperature over the course of 6 hours whilst phosgene was simultaneously passed into the vessel. The volume of liquid in the reactor was always constant, since a diisocyanate solution was withdrawn through the overflow corresponding to the addition of diamine solution. After completion of the addition the solvent was distilled off and 22.5 g. of a liquid with an isocyanate content of 25.4% remained. Distillation of this crude product at 175–182° C./0.1–0.15 mm. Hg yielded 19.20 g. of 1,3-di-($\gamma$-isocyanatopropyl)-5,5-diethylhydantoin.

Elementary analysis.—Calculated: $C_{15}H_{22}N_4O_4$ (322.4), (percent): C, 15.88; H, 6.88; N, 17.38. Found (percent): C, 16.28; H, 7.17; N, 16.86.

The H-NMR spectrum and IR spectrum agree with the assumed structure. Accordingly, the resulting diisocyanate has the formula

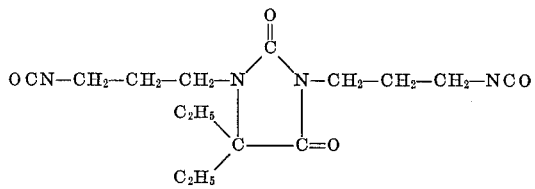

EXAMPLE 3

A solution of 20.0 g. of 1,3 - di - ($\gamma$-aminopropyl)-5-methyl-5-ethylhydantoin in 380 ml. of dry o-dichlorobenzene was phosgenated for 7 hours at about 165° C. in the same manner as in Example 2. After distilling off the solvent, 24.6 g. of liquid with an isocyanate content of 24.6% (90.1% of theory) remained. Distillation of this crude product at 162–166° C./0.1 mm. Hg yielded 11.5 g. of 1,3 - di - ($\gamma$-isocyanatopropyl)-5-methyl-5-ethylhydantoin with an isocyanate content of 25.2% (92% of theory).

Elementary analysis.—Calculated: $C_{14}H_{20}N_4O_4$ (308.3), (percent): C, 54.53; H, 6.54; N, 18.17. Found (percent): C, 54.82; H, 6.50; N, 17.89.

The H-NMR spectrum and IR spectrum agree with the assumed structure. Accordingly, the resulting diisocyanate has the formula

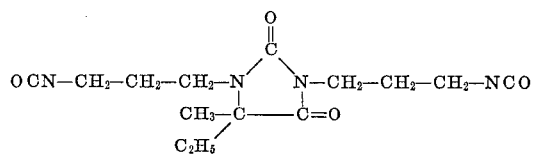

EXAMPLE 4

A solution of 20 g. of 1,3 - di - ($\gamma$-aminopropyl)-1,3-diaza-spiro-(4.5)-decane-2,4-dione in 380 ml. of dry o-dichlorobenzene was phosgenated for 135 minutes at about 165° C. in the same manner as in Example 2. After distilling off the solvent, 25.5 g. of substance having an isocyanate content of 22.8% (90.6% of theory) remained. Distillation of this crude product at 175–180° C./0.07 mm. Hg yielded 16.3 g. of 1,3-di-($\gamma$-isocyanatopropyl)-1,3-diaza-spiro-[4.5]-decane-2,4-dione with an isocyanate content of 23.9% (95% of theory).

Elementary analysis.—Calculated: $C_{15}H_{22}N_4O_4$ (322.4), (percent): C, 57.47; H, 6.63; N, 16.76. Found (percent): C, 57.11; H, 6.43; N, 16.39.

The H-NMR spectrum and IR spectrum agree with the assumed structure. Accordingly, the resulting diisocyanate has the formula

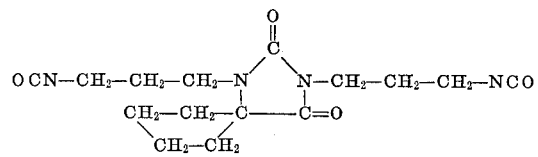

EXAMPLE 5

A solution of 20.0 g. of 1,3-di-($\gamma$-aminopropyl)-1,3-diaza-spiro-(4.4)-nonane-2,4-dione in 380 ml. of dry o-dichlorobenzene was phosgenated for 200 minutes at about 165° C. in the same manner as in Example 2. After distilling off the solvent, 24.1 g. of substance having an isocyanate content of 25.1% (95.5% of theory) remained. Distillation of this crude product of 177–180° C./0.1 mm. Hg yielded 17.1 g. of 1,3-di-(γ-isocyanatopropyl)-1,3-diaza-spiro-[4.4]-nonane-2,4-dione with an isocyanate content of 25.65% (97.6% of theory).

Elemental analysis.—Calculated: $C_{15}H_{20}N_4O_4$ (323.3), (percent): C, 56.24; H, 6.29; N, 17.49. Found (percent): C, 56.43; H, 6.43; N, 17.23.

The H-NMR spectrum and IR spectrum agree with the assumed structure. The resulting diisocyanate accordingly has the formula

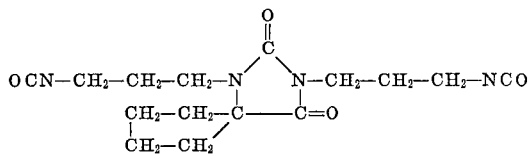

EXAMPLE 6

A solvent mixture of 150 ml. of dry dioxane and 50 ml. of dry o-dichlorobenzene was saturated with phosgene at 15–16° C. A solution of 45 g. of 1,3-di-(γ-aminopropyl)-5-isopropylhydantoin in 50 ml. of dry dioxane and 50 ml. of dry o-dichlorobenzene was added dropwise to this solution over the course of 75 minutes. In the course thereof, the temperature rose to 53° C.; a salt-like product precipitated. This suspension was stirred for 2 hours at 50° C. and thereafter still warmed for 3.5 hours to 100–110° C. The reaction product was filtered and the filtrate was largely concentrated. 36.5 g. of a substance with an isocyanate content of 22.6% (83% of theory) remained. Distillation of this crude product yielded 20.8 g. of 1,3-di-(γ-isocyanatopropyl)-5-isopropylhydantoin with an isocyanate content of 26.65% (97.8% of theory).

Elementary analysis. — Calculated: $C_{14}H_{20}N_4O_4$ (308.33), (percent): C, 54.53; H, 6.54; N, 18.17. Found (percent): C, 54.37; H, 6.27; N, 18.09.

The H-NMR spectrum and IR spectrum agree with the assumed structure. The resulting diisocyanate accordingly has the formula

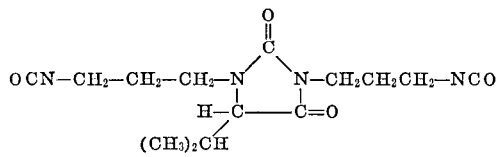

EXAMPLE 7

Carbon dioxide was passed for one hour at room temperature into a solution of 20.0 g. (0.078 mol) of 1,3-di-(γ-aminopropyl)-5,5-dimethyl-5,6-dihydrouracil in 400 ml. of dry o-dichlorobenzene, whereby a jelly-like mass was produced. Phosgene was passed into this firstly for 2 hours at 30–35° C. and then for a further 5 hours at 160° C. The brown solution thereby produced was freed of solvent as far as possible at 80° C. and 10 mm. Hg and 24.0 g. of a brown viscous oil with an isocyanate content of 23.4% (85% of theory) remained. A distillation of this crude product yielded 14.8 g. of colourless 1,3-di-(γ-isocyanatopropyl)-5,5-dimethyl-5,6-dihydrouracil of boiling point $_{0.2}$ 176–182° C. and having an isocyanate content of 23.7% (87% of theory).

The H-NMR spectrum and IR spectrum agree with the assumed structure. The resulting diisocyanate accordingly has the formula

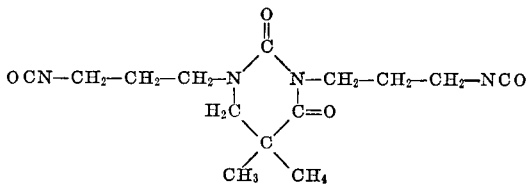

USE EXAMPLE 10 g. at a time of a 60% strength solution of a polyester-alcohol having an acid number of less than 4 and an OH group content of about 8% (a commercial product obtainable from Messrs. Bayer under the registered trade name "Desmophen 650") in an organic solvent mixture consisting of ethylglycol acetate/methyl ethyl ketone/toluene in the weight ratio of 1:1:1 were mixed, in a first sample, with 4.6 g. of 1,3-di-(γ-isocyanatopropyl)-5,5-dimethylhydantoin (diisocyanate A) and in a second sample with 5.25 g. of 1,3-di-(γ-isocyanatopropyl)-5,5-dimethyl-5,6-dihydrouracil (diisocyanate B) (ratio of HO groups to OCN groups=1:1). 50% strength lacquer solutions were in each case produced by adding further solvent mixture of ethylglycol acetate/methyl ethyl ketone/toluene in a weight ratio of 1:1:1. These lacquer solutions were applied to previously cleaned aluminium sheets and cured under the conditions indicated in the following table, and subsequently the properties of the cured lacquers were determined.

By way of comparison, two known 50% strength lacquer solutions were manufactured, respectively using, instead of the new diisocyanates A and B, 2.4 g. of 1,6-hexamethylenediisocyanate (diisocyanate C) and 7.2 g. of a trifunctional polyisocyanate, containing biuret groups, obtainable by reaction of 3 mols of 1,6-hexamethylenediisocyanate with 1 mol of water (polyisocyanate D) which is commercially available from Messrs. Bayer under the registered trade name "Desmodur N." The known diisocyanates or polyisocyanates C and D were mixed with the same amount of "Desmophen 650" (10 g.) and the same organic solvent mixture and the lacquer solutions thus obtained were applied, cured and tested as described above.

The table which follows contains the comparison of the properties of lacquers which were manufactured using diisocyanates A, B and C and polyisocyanate D.

TABLE

Properties of Lacquer Solutions of a Polyester-alcohol ("Desmophen 650") and Various Diisocyanates and Polyisocyanates

| | Diisocyanate | | | Polyisocyanate, |
|---|---|---|---|---|
| | A | B | C | D |
| Pot life of a 50% strength lacquer solution in ethylglycol acetate-methyl ethyl ketone-toluene (=1:1:1 parts by weight), days | 2.5 | 3 | 2.0 | 1.5 |
| At 20° C./65% relative humidity the lacquer is dust-dry after—hours | 18 | 21 | 19 | 18.5 |
| After curing at 20° C. the pendulum hardness according to Persoz is: | | | | |
| After 1 day | 145 | 90 | 111 | 88 |
| After 3 days | 280 | 325 | 288 | 285 |
| After 7 days | 328 | 358 | 330 | 346 |
| Pendulum hardness according to Persoz (after curing at 120° C. for 60 minutes) | 380 | 300 | 395 | 390 |
| Resistance to acetone after curing at— | | | | |
| 120° C./60 minutes | (¹) | (¹) | (¹) | (¹) |
| 150° C./120 minutes | (²) | (² | (¹) | (²) |

¹ Tacky.  ² Scratch resistant.

The comparison shows that the pot life of lacquer solutions based on diisocyanate A according to the invention and diisocyanate B according to the invention is longer than that of the two other lacquer solutions based on diisocyanate C and polyisocyanate D. The lacquer based on diisocyanate A after one day's cure at 20° C. shows a pendulum hardness which is 64% higher than that shown by the lacquer manufactured from polyisocyanate D. This deserves mention since it is important for many uses of lacquers that the lacquer should reach a certain hardness as rapidly as possible.

The lacquer based on diisocyanate B reaches a somewhat greater hardness after 7 days' cure at 20° C. than the lacquer manufactured on the basis of diisocyanate A or on the basis of polyisocyanate D.

The pendulum hardness after 1 hour's curing at 120° C. also shows that with the bifunctional diisocyanate A lacquers are obtained which surprisingly have equally good properties to those obtained with the trifunctional polyisocyanate D. Since lacquers based on trifunctional isocyanates, for example polyisocyanate D show a greater density of the crosslinking points it would have been expected that lacquers from diisocyanates A and B would possess distinctly worse properties. Diisocyanate C, which also yields lacquers with usable properties, is not used as a lacquer raw material because of its relatively high vapour pressure and the toxic effects resulting therefrom.

What is claimed is:

1. A diisocyanate containing a mononuclear N-heterocyclic ring, of formula

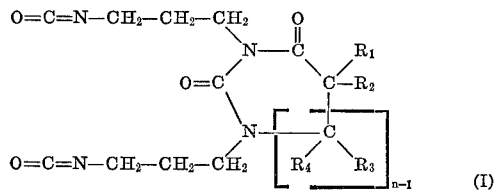

(I)

wherein $R_1$ and $R_3$ each represents a member selected from the group consisting of a hydrogen atom, alkyl with 1 to 4 carbon atoms, alkenyl with 1 to 4 carbon atoms, cyclohexenyl, cyclohexyl and phenyl, $R_2$ and $R_4$ each represents a member selected from the group consisting of a hydrogen atom and alkyl with 1 to 4 carbon atoms or wherein $R_1$ and $R_2$ together form a divalent residue selected from the group consisting of tetramethylene residue and pentamethylene residue, and $n$ denotes an integer having a value of 1 or 2.

2. A diisocyanate according to claim 1, wherein $R_1$, $R_2$ and $R_3$ each represents a member selected from the group consisting of hydrogen atom and $C_1$-$C_4$-alkyl, and wherein $R_4$ represents a hydrogen atom.

3. 1,3-di-(γ-isocyanatopropyl)-5,5-dimethylhydantoin.

4. 1,3-di-(γ-isocyanatopropyl) - 5,5 - dimethyl-5 6-dihydrouracil.

5. 1,3-di-(γ-isocyanatopropyl)-5,5-diethylhydantoin.

6. 1,3-di-(γ-isocyanatopropyl) - 5 - methyl-5-ethylhydantoin.

7. 1,3-di-(γ-isocyanatopropyl) - 1,3 - diaza-spiro-[4.5]-decane-2,4-dione.

8. 1,3-di-(γ-isocyanatopropyl) - 1,3 - diaza-spiro[4.4]-nonane-2,4-dione.

9. 1,3-di-(γ-isocyanatopropyl)-5-isopropylhydantoin.

References Cited

UNITED STATES PATENTS 3,509,198   4/1970   Kuehle et al. _____ 260—260

ALEX MAZEL, Primary Examiner

A. M. T. TIGHE, Assistant Examiner

U.S. Cl. X.R.

260—77.5, 256.4 309.5